(12) United States Patent
Berchtold et al.

(10) Patent No.: US 12,533,365 B1
(45) Date of Patent: Jan. 27, 2026

(54) FAST ABSORBING TROLAMINE SALICYLATE FORMULATIONS AND COMPOSITIONS

(71) Applicant: THEE, Inc., San Francisco, CA (US)

(72) Inventors: Brian Berchtold, St. Helena, CA (US); Mark Kallgren, Phoenix, AZ (US); Brian Keller, Antioch, CA (US)

(73) Assignee: THEE, INC., San Francisco, CA (US)

( * ) Notice: Subject to any disclaimer, the term of this patent is extended or adjusted under 35 U.S.C. 154(b) by 0 days.

(21) Appl. No.: 19/060,423

(22) Filed: Feb. 21, 2025

(51) Int. Cl.

| | | |
|---|---|---|
| *A01N 43/00* | (2006.01) | |
| *A01N 43/46* | (2006.01) | |
| *A61K 9/00* | (2006.01) | |
| *A61K 31/133* | (2006.01) | |
| *A61K 31/355* | (2006.01) | |
| *A61K 31/55* | (2006.01) | |
| *A61K 31/60* | (2006.01) | |
| *A61K 36/28* | (2006.01) | |
| *A61K 36/53* | (2006.01) | |
| *A61K 36/537* | (2006.01) | |
| *A61K 36/87* | (2006.01) | |
| *A61K 47/10* | (2017.01) | |
| *A61K 47/14* | (2017.01) | |
| *A61K 47/34* | (2017.01) | |
| *A61P 29/00* | (2006.01) | |

(52) U.S. Cl.
CPC ............ *A61K 31/60* (2013.01); *A61K 9/0014* (2013.01); *A61K 31/133* (2013.01); *A61K 31/355* (2013.01); *A61K 36/28* (2013.01); *A61K 36/53* (2013.01); *A61K 36/537* (2013.01); *A61K 36/87* (2013.01); *A61K 47/10* (2013.01); *A61K 47/14* (2013.01); *A61K 47/34* (2013.01); *A61P 29/00* (2018.01)

(58) Field of Classification Search
None
See application file for complete search history.

(56) References Cited

U.S. PATENT DOCUMENTS

2007/0020220 A1    1/2007 Osborne

OTHER PUBLICATIONS

Banker et al., "Modern Pharmaceutics", Drugs and the Pharmaceutical Sciences, 1979, vol. 7. (29 pages).
Cho et al., "Impact of Molecular Symmetry on Crystallization Pathways in Highly Supersaturated KH2PO4 Solutions", Nature Communications, 2024, pp. 1-9, vol. 15, No. 3117.
DIFFRAC EVA., Brucker, DIFFRAC.SUITE User Manual, Apr. 2010, pp. 139-141. (266 pages)
Goodman et al., The Pharmacological Basis of Therapeutics, 6th Edition, MacMillan Publishing Co. New York, 1980. (56 pages).
Pathan et al., "Chemical Penetration Enhancers for Transdermal Drug Delivery Systems", Tropical Journal of Pharmaceutical Research, Apr. 2009, pp. 173-179, vol. 8, No. 2.
Williams et al., "Penetration Enhancers", Advanced Drug Delivery Reviews, Mar. 27, 2004, pp. 603-618, vol. 56, No. 5.
Yamaguchi, "X-Ray and Neutron Scattering", Coordination Chemistry Fundamentals: Metal Ions and Complexes in Solution, published by the Royal Society of Chemistry, 2023, pp. 20-39.

*Primary Examiner* — Layla Soroush
(74) *Attorney, Agent, or Firm* — BUCHANAN INGERSOLL & ROONEY PC (57) ABSTRACT

Disclosed herein are topical pharmaceutical compositions including an effective amount of trolamine salicylate that provide quick and long-lasting pain relief. Disclosed herein are also methods of treating a topical injury or pain with the topical pharmaceutical compositions.

10 Claims, 3 Drawing Sheets

FAST ABSORBING TROLAMINE SALICYLATE FORMULATIONS AND COMPOSITIONS

FIELD

The present disclosure relates to fast absorbing trolamine salicylate formulations and compositions.

BACKGROUND

Trolamine salicylate is an organic compound or a salt formed between triethanolamine and salicylic acid (see Formula I below):

(Formula I)

Trolamine salicylate can be used to treat minor pains in the muscles and joints caused by arthritis, backache, strains, sprains, bruises and cramps. Typically, trolamine salicylate is formulated as a topical analgesic and applied onto the skin of the area where pain is occurring. Once trolamine salicylate has been absorbed into the body, the compound elicits its therapeutic activity by inhibiting the fatty acid cyclooxygenase (COX) enzyme in inflammatory cells, thereby blocking the production of prostaglandins and thromboxanes involved in the generation of pain and inflammation in the body.

Trolamine salicylate, much like other salicylates, displays low systemic absorption upon dermal or topical administration. This low systemic absorption can lead to the overuse of the compound by individuals suffering from pain, especially those seeking rapid relief. The overuse of trolamine salicylate can induce salicylate intoxication in individuals, which can cause nausea, vomiting, diaphoresis, vertigo, hyperventilation, tachycardia, hyperactivity and tinnitus at early stages. If toxicity progresses, agitation, delirium, hallucinations, convulsions, lethargy, and stupor could occur. In severe circumstances, salicylate intoxication can be fatal.

Thus, to address the foregoing issues and reduce the risk of salicylate intoxication from overuse of trolamine salicylate, fast absorbing and long-lasting trolamine salicylate formulations and compositions are disclosed herein.

SUMMARY

Disclosed herein is a topical pharmaceutical composition including (i.e., comprising) an effective amount of trolamine salicylate solubilized in propylene glycol, wherein the trolamine salicylate has Form I when solubilized in a 20% propylene glycol solution, wherein the Form 1 has at least two X-ray scattering peaks in terms of Q, which is $4\pi$ times sin ($\theta$) divided by the wavelength (Q=$4\pi$ sin ($\theta$)/$\lambda$), of 1.21 to 1.52 ($\pm$0.16) $\text{Å}^{-1}$ and 1.60 to 1.89 ($\pm$0.15) $\text{Å}^{-1}$ at a humidity of 20% or lower.

Disclosed herein are also methods of treating a topical injury or pain, the method including administering a topical pharmaceutical composition including an effective amount of Form 1 of trolamine salicylate solubilized in propylene glycol.

BRIEF DESCRIPTION OF THE DRAWINGS

Other features and advantages of the compositions, devices and methods disclosed herein will be apparent to those skilled in the art reading the following detailed description in conjugation with the exemplary embodiments illustrated in the drawings, wherein.

DETAILED DESCRIPTION

All publications, patent applications, patents, and other references mentioned herein are incorporated by reference in their entirety. Unless otherwise defined, all technical and scientific terms used herein have the same meaning as commonly understood by one of ordinary skill in the art to which this disclosure belongs. In case of conflict, the present specification, including definitions, will control.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

One aspect of the present disclosure is a topical pharmaceutical composition including an effective amount of trolamine salicylate solubilized in propylene glycol, wherein the trolamine salicylate has Form I when solubilized in a 20% propylene glycol solution, wherein the Form 1 has at least two X-ray scattering peaks in terms of Q, which is $4\pi$ times sin ($\theta$) divided by the wavelength sin ($\theta$) divided by the wavelength (Q=$4\pi$ sin ($\theta$)/$\lambda$), of 1.21 to 1.52 ($\pm$0.16) $\text{Å}^{-1}$ and 1.60 to 1.89 ($\pm$0.15) $\text{Å}^{-1}$. In exemplary embodiments, the trolamine salicylate has Form I when solubilized in propylene glycol at a humidity of 20% or lower.

As used herein, the term "about" refers to a value that is $\pm$5% of the stated value. In addition, it is understood that reference to a range of a first value to a second value includes the range of the stated values, e.g., a range of about 1 to about 5 also includes the more precise range of 1 to 5. It is also understood that the ranges disclosed herein include any selected subrange within the stated range, e.g., a subrange of about 50 to about 60 is contemplated in a disclosed range of about 1 to about 100.

As used herein, the phrase "effective amount of trolamine salicylate" means any amount of trolamine salicylate that when administered to an individual for treating a state, disease, disorder or condition associated with pain is sufficient to affect such treatment. The effective amount can vary depending on the particular state, disease, disorder or condition being treated and its severity and the age, weight, physical condition and responsiveness of the individual to be treated. Thus, one or more of these parameters can be used to select and adjust the effective amount of trolamine salicylate. Also, the amount can be determined using pharmacologic methods known in the art such as dose response curves.

Form 1 can be determined via the use of wide-angle X-ray scattering (WAXS). WAXS is the analysis of X-ray peaks scattered to wide angles, which is caused by sub-nanometer-sized structures. These techniques are X-ray scattering methods and commonly used to determine a range of information about crystalline, semi-crystalline and amorphous materials. WAXS is similar to small-angle X-ray scattering (SAXS) but with the increasing angle to probe smaller length scales. This requires samples to have short range order for information to be extracted. Most diffractometers can be used to perform both WAXS and limited SAXS in a single run (small- and wide-angle scattering, S/WAXS) by adding a beamstop or knife edge. Though WAXS is typically used to determine the degree of order of polymer samples, this technique can also be used to determine the chemical short-range structure of a compound solubilized in a solution. WAXS uses a wide-angle X-ray goniometer to scan a sample. The scattering intensity captured by the goniometer is plotted as a function Q ($4\pi \sin(\theta)/\lambda$). X-ray scattering techniques, such as WAXS, are further described by Toshio Yamaguchi ("X-ray and Neutron Scattering", Coordination Chemistry Fundamentals: Metal Ions and Complexes in Solution, Volume 2, edited by Toshio Yamaguchi and Ingmar Persson, published by the Royal Society of Chemistry, 2023, pp. 20-39) and Cho et al. (Cho, Y. C. et al., "Impact of molecular symmetry on crystallization pathways in highly supersaturated $KH_2PO_4$ solutions", *Nat. Commun.*, 2024, 15:3117).

In exemplary embodiments, the trolamine salicylate has Form I when solubilized in a 20% propylene glycol solution, wherein the Form 1 has at least two X-ray scattering peaks in terms of Q, which is $4\pi$ times sin ($\theta$) divided by the wavelength (Q=$4\pi \sin(\theta)/\lambda$) of 1.31 (±0.16) Å$^{-1}$ and 1.74 (±0.15) Å$^{-1}$ at a humidity of 20% or lower.

In exemplary embodiments, the topical pharmaceutical composition provides a pain alleviating effect at least 5 minutes after use, at least 10 minutes after use, at least 15 minutes after use, at least 20 minutes after use, at least 25 minutes after use, at least 30 minutes after use, or any time or time range from 5 minutes to 30 minutes after use.

In exemplary embodiments, the topical pharmaceutical composition provides a pain alleviating effect that last for at least 4 hours, that lasts for at least 5 hours, that lasts for at least 6 hours, that lasts for at least 7 hours, that lasts for at least 8 hours, or that lasts for any time or time range from 4 hours to 8 hours.

In exemplary embodiments, the topical pharmaceutical composition contains about 2.00% w/w, 5.00% w/w, 10.00% w/w, 15.00% w/w, 20.00% w/w or any % w/w falling within about 2.00% w/w to 20.00% w/w of trolamine salicylate, wherein the trolamine salicylate exists as Form 1.

As used herein, "% w/w" refers to a specific components weight contribution to a total weight of a composition or formulation. For example, if a 100 g composition contains 10 g of trolamine salicylate, then the weight contribution of trolamine salicylate to the total weight of the composition would be 10% w/w.

In exemplary embodiments, the topical pharmaceutical composition contains about 1.00% w/w to about 10.00% w/w, about 1.00% w/w to about 4.00% w/w, or any % w/w falling within the range of 1.00% w/w to about 10.00% w/w propylene glycol.

The topical pharmaceutical composition can contain one or more additives such as, but not limited to, purified water, isopropyl myristate, caprylic/capric/myristic/stearic triglyceride, dimethicone, cyclomethicone, cetyl alcohol, dimethyl sulfone, glucosamine sulfate, stearyl alcohol, glyceryl monosterate, PEG-12 glyceryl dimyristate, PEG-23 glyceryl disterate, PEG-100 stearate, glyceryl stearate, tocopheryl acetate, rosemary leaf extract, *chamomilla recutita* (*matricaria*) flower extract, lavender extract, grape seed extract, a fragrant compound or fragrant mixture, a preservative, a rheology modifier, white petrolatum, shea butter, Polysorbate 80, potassium sorbate, and/or phenoxyethanol.

In exemplary embodiments, the topical pharmaceutical composition contains any % w/w falling within the range of about 45.00% w/w to about 95.00% w/w of purified water. In exemplary embodiments, the topical pharmaceutical composition contains about 45.00% w/w to about 81.00% w/w of purified water.

In exemplary embodiments, the topical pharmaceutical contains: about 10.00% w/w trolamine salicylate, about 54.00 wt % w/w purified water, about 1.50% w/w isopropyl myristate, about 1.50% w/w caprylic/capric/myristic/stearic triglyceride, about 2.50% w/w dimethicone, about 1.50% w/w cyclomethicone, about 5.00% w/w cetyl alcohol, about 1.00% w/w dimethyl sulfone, about 1.00% w/w glucosamine sulfate, about 3.00% w/w stearyl alcohol, about 1.50% w/w glyceryl monosterate, about 4.00% w/w propylene glycol, about 4.00% wt/wt PEG-12 glyceryl dimyristate, about 2.00% w/w PEG-23 glyceryl disterate, about 2.00% w/w PEG-100 stearate, about 2.00% w/w glyceryl stearate, about 0.25% w/w tocopheryl acetate, about 0.20% w/w rosemary leaf extract, about 0.25% w/w *chamomilla recutita* (*matricaria*) flower extract, about 0.25% w/w lavender extract, about 0.10% w/w grape seed extract, about 1.00% w/w of a fragrant compound or mixture and about 0.80% w/w of a preservative.

In exemplary embodiments, the topical pharmaceutical composition contains: about 81.00% w/w purified water, about 10.00% w/w trolamine salicylate, about 2.00% w/w of a rheology modifier, about 1.00% w/w propylene glycol, about 1.00% w/w PEG-12 glyceryl dimyristate, about 3.00% w/w PEG-23 glyceryl disterate, about 1.00% w/w phenoxyethanol and about 1.00% w/w of a fragrant compound or mixture.

In exemplary embodiments, the topical pharmaceutical composition contains: about 20.00% w/w white petrolatum, about 17.50% w/w shea butter, about 3.50% w/w PEG-100 stearate, about 2.50% w/w Polysorbate 80, about 10.00% w/w trolamine salicylate, about 45.00% w/w purified water, about 1.00% phenoxyethanol and about 0.50% w/w potassium sorbate.

In exemplary embodiments, the topical pharmaceutical compositions contain at least one component capable of producing a self-forming, thermodynamically stable liposome. Components that are capable of producing a self-forming, thermodynamically stable liposome include, but are not limited to, PEG-12 GDO, PEG-12 GDM, PEG-23 GDP, PEG-12 GDS, PEG-23 GDS, and PEG-23 glyceryl palmitate. GDO means glycerol dioleate, GDM means glycerol dimyristate, GDP means glycerol dipalmitate, and GDS means glycerol distearate. Components that are capable of producing a self-forming, thermodynamically stable liposome include can also include lipid compositions possessing packing parameters which allow the formation of liposomes, lipids or lipid compositions that include polyethyleneglycol (PEG) or any polymer of similar properties as part of the head group, and/or lipids or lipid compositions have a melting temperature between about 0° C. to 100° C. which allow for it to be in liquid form when mixed with an aqueous solution. Components that are capable of producing a self-forming, thermodynamically stable liposome can also include any lipid molecule possessing a packing parameter with respect to surface area ($P_a$) between about 0.84 and 0.88, and/or a packing parameter with respect to volume ($P_v$) between 0.88 and 0.93. Equations that can be used to determine these parameters are disclosed in U.S. Pat. No. 6,610,322. Components that are capable of producing a self-forming, thermodynamically stable liposome can also include lipid or liposome suspension having a bending elastic modulus between about 0 kt and 15 kt. Components that are capable of producing a self-forming, thermodynamically stable liposome can also include a PEG chain having a molecular weight between about 300 Daltons and 5000 Daltons.

Most, if not all, known liposome suspensions are not thermodynamically stable and include liposomes that are kinetically trapped into higher energy states by the energy used in their formation. Indeed, most phospholipid bilayer membranes only form liposomes through self-closure when external energy is applied. The main source of this external energy during encapsulation comes from processes such as ultrasonic treatment, high-speed mixing, homogeneous high-pressure treatment, and high-speed cutting fluid treatment. Since every high-energy state tries to lower its free energy, known liposome formulations experience problems with aggregation, fusion, sedimentation and leakage of liposome associated material. Accordingly, the use of at least one component that is capable of producing a self-forming, thermodynamically stable liposome in the topical pharmaceutical formulations can avoid these problems while capsulating trolamine salicylate of Form I. Other advantages of using at least one component that is capable of producing a self-forming, thermodynamically stable liposome in the topical pharmaceutical formulations include, but are not limited to, improved solubilization of ingredients/components, microencapsulation to stabilize other ingredients/components, prolonging the time ingredients/components stay on the site of administration (e.g., the skin), sustained release of other ingredients/components for continuous effect, improved barrier function and hydration of the skin, and improved skin penetration ability.

In exemplary embodiments, the topical pharmaceutical composition contains at least one extracellular matrix component, fragments thereof and/or combinations thereof. Extracellular matrix (ECM) components can be divided into several classes of biomolecules based upon their structure and function within an extracellular matrix. The most prominent class is the structural class of extracellular matrix proteins. These include the collagen and elastin families of proteins. Collagen fibers can strengthen and organize the matrix; elastin fibers can provide flexibility and resilience. Another class is of specialized proteins, such as fibrillin, fibronectin, laminin, merosin, tenascin, and vitronectin, which serve less of a structural role and more of an adhesive or integral role within the extracellular matrix. These proteins allow for cell attachment and form crosslinks within the matrix gel. Numerous proteoglycans and heparan sulfate containing proteins can form the highly hydrated gel-like mixture that helps stabilize the matrix within an aqueous environment. Proteoglycans include a protein core to which is attached long chains of glycosaminoglycans (GAGs) forming extremely complex high molecular weight components of the ECM. Another GAG which can be a component of an extracellular matrix is hyaluronic acid, a non-sulfate GAG.

The extracellular matrix component can be, but is not limited to, proteins, peptides, or a receptor associated with an extracellular matrix, hyaluronic acid, elastin, collagen, fibronectin, lectin, and fragments thereof and combinations thereof. Such fragments can include, without limitation, hyaluronic acid fragments, collagen fragments, fibronectin fragments, elastin fragments, lectin fragments, and combinations thereof.

In exemplary embodiments, the topical pharmaceutical composition contains from about 0.001% w/w to about 10% w/w, from about 0.1% w/w to about 2.0% w/w, about 0.25% w/w to about 3.0% w/w, about 0.5% w/w to about 5.0% w/w, about 0.75% w/w to about 7.5% w/w, or any range or individual concentration encompassing these example ranges of one or more extracellular matrix components.

In exemplary embodiments, the topical pharmaceutical composition contains one or more enzymes capable of facilitating delivery of trolamine salicylate through one or more layers of skin. These enzymes can include, but are not limited to, a hyaluronidase and an elastase. These enzymes can be present in the topical pharmaceutical composition in concentrations ranging from about 0.1% w/w to about 25% w/w, about 0.1% w/w to about 20% w/w, about 0.1% w/w to about 15% w/w, about 0.1% w/w to about 10% w/w, about 0.1% w/w to about 8% w/w, about 0.1% w/w to about 5% w/w, about 0.1% w/w to about 4% w/w, about 0.1% w/w to about 3% w/w, about 0.1% w/w to about 3% w/w, or about 0.1% w/w to about 1% w/w. In other exemplary embodiments, the enzymes are present in concentrations of about 0.1% w/w, about 0.5% w/w, about 1% w/w, about 2% w/w, about 5% w/w, about 10% w/w, about 25% w/w, and/or any individual amount or any ranges between any two of these values.

In exemplary embodiments, the topical pharmaceutical composition contains one or more additional active agents. Non-limiting examples of active agents include a biologic, therapeutic peptides, biomimetic peptide, small molecule and macromolecular analgesic agents, antifungal agents, antibacterial agents, anesthetic agents, proteins, prostaglandins, enzyme inhibitors, steroids, small molecule drugs, macromolecular drugs, biologics, antibodies, chimeric antibodies, antibody fragments, diagnostic antibodies, antigens, peptides, adjuvants, antioxidants, cosmetic ingredients, therapeutic cells, diagnostic agents, radioactive tracers, contrast agents, neurotoxins, sensation modifying agents, and the like and combinations thereof.

In exemplary embodiments, the topical pharmaceutical composition contains one or more sensation modifying agents. Examples of sensation modifying agents include, but are not limited to, a cooling agent, a warming agent, a relaxing or soothing agent, a stimulating or refreshing agent, and mixtures thereof.

The cooling agent can be selected from, but is not limited to, menthol; an isomer of menthol, a menthol derivative; 4-Methyl-3-(1-pyrrolidinyl)-2 [5H]-furanone; WS-23, Icilin, Icilin Unilever Analog, 5-methyl-4-(1-pyrrolidinyl)-3-[2H]-furanone; 4,5-dimethyl-3-(1-pyrrolidinyl)-2 [5H]-furanone; isopulegol, 3-(1-menthoxy) propane-1,2-diol, 3-(1-menthoxy)-2-methylpropane-1,2-diol, p-menthane-2,3-diol, p-menthane-3,8-diol, 6-isopropyl-9-methyl-1,4-dioxas-piro [4,5]decane-2-methanol, menthyl succinate and its alkaline earth metal salts, trimethylcyclohexanol, N-ethyl-2-isopropyl-5-methylcyclohexanecarb-oxamide, Japanese mint (*Mentha arvensis*) oil, peppermint oil, menthone, menthone glycerol ketal, menthyl lactate, 3-(1-menthoxy) ethan-1-ol, 3-(1-menthoxy) propan-1-ol, 3-(1-menthoxy) butan-1-ol, 1-menthylacetic acid N-ethyl amide, 1-menthyl-4-hydroxypentanoate, 1-menthyl-3-hydroxybutyrate, N,2,3-trimethyl-2-(1-methyl ethyl)-butanamide, spearmint oil and combinations thereof.

The warming agent can be selected from, but is not limited to, polyhydric alcohols, capsaicin, *capsicum* powder, a *capsicum* tincture, *capsicum* extract, capsaicin, hamamalis, homocapsaicin, homodihydrocapsaicin, nonanoyl vanillyl amide, nonanoic acid vanillyl ether, vanillyl alcohol alkyl ether derivatives, such as vanillyl ethyl ether, vanillyl butyl ether, vanillyl pentyl ether, and vanillyl hexyl ether, isovanillyl alcohol alkyl ethers, ethylvanillyl alcohol alkyl ethers, veratryl alcohol derivatives, substituted benzyl alcohol derivatives, substituted benzyl alcohol alkyl ethers, vanillin propylene glycol acetal, ethylvanillin propylene glycol acetal, ginger extract, ginger oil, gingeol, gingeron and combinations thereof.

The relaxing or soothing agent can be selected from, but is not limited to, herb extracts, selected from the group including of aloe vera, alpha bisabolol, D-panthenol, allantoin, *hamamelis*, chamomile, yarrow; calendula, comfrey, witch hazel and other astringents, sea weed, and oat extracts; oils, selected from the group consisting of: almond oil, avocado oil, and comfrey; and essential oils, selected from the group consisting of: cardamone, *eucalyptus, Mentha piperita* (peppermint), hyssop, and rosemary; waxy or unctuous substances selected from the group consisting of: lanolin or vaselline jelly, minerals, selected from the group consisting of: zinc oxide, calamine and selenium; vitamins, selected from the group consisting of: tocopheryl acetate (vitamin E), and pharmaceutical agents selected from the group consisting of: analgesics, anesthetics, anti-inflammatory agents, and anti-histamines, and muscle relaxants; menthol, camphor, eugenol, eucalyptol, safrol, methyl salicylate, menthyl lactate, menthyl ethoxyacetate, menthone glycerinacetal, 3-1-menthoxypropane-1,2-diol, ethyl 1-menthyl carbonate, (1S,3S,4R)-p-menth-8-en-3-ol, menthyl pyrrolidone carboxylate, N-substituted-p-menthane-3-carboxamides *hamamelis* extract, ginger oil and combinations thereof.

The topical pharmaceutical compositions disclosed herein can be formulated as a paste, gel, ointment, lotion, emulsion, cream, foam, mousse, liquid, spray, suspension, dispersion, powder, or aerosol.

In exemplary embodiments, the topical pharmaceutical composition contains one or more cosmetic or pharmaceutically acceptable diluents, fillers, disintegrants, binders, lubricants, surfactants, hydrophobic vehicles, water soluble vehicles, emulsifiers, buffers, humectants, moisturizers, solubilizers, preservatives, colorants, plastizers, carriers, excipients, and combinations thereof. The person of ordinary skill in the art can refer to various pharmacologic references such as, for example, Modern Pharmaceutics, Banker & Rhodes, Marcel Dekker, Inc. (1979) and Goodman & Gilman's The Pharmaceutical Basis of Therapeutics, 6th Edition, MacMillan Publishing Co, New York (1980) for guidance in determining the amount of such components in the composition.

Excipients that can be included in the composition can be selected from, but are not limited to, gelatin, casein, lecithin, gum acacia, cholesterol, tragacanth, stearic acid, benzalkonium chloride, calcium stearate, glyceryl monostearate, cetostearyl alcohol, cetomacrogol emulsifying wax, sorbitan esters, polyoxyethylene alkyl ethers, polyoxyethylene castor oil derivatives, polyoxyethylene sorbitan fatty acid esters, polyethylene glycols, polyoxyethylene stearates, colloidol silicon dioxide, phosphates, sodium dodecyl sulfate, carboxymethylcellulose calcium, carboxymethylcellulose sodium, methylcellulose, hydroxyethylcellulose, hydroxypropylcellulose, hydroxypropylmethycellulose phthalate, noncrystalline cellulose, magnesium aluminum silicate, triethanolamine, polyvinyl alcohol, polyvinylpyrrolidone, sugars, starches and combinations thereof.

Surfactants (i.e., surface-active agents that lower surface tension and thereby increase the emulsifying, foaming, dispersing, spreading and wetting properties of a product) that can be include in the composition can be selected from, but are not limited to, emulsifying wax, glyceryl monooleate, polyoxyethylene alkyl ethers, polyoxyethylene castor oil derivatives, polysorbate, sorbitan esters, benzyl alcohol, benzyl benzoate, cyclodextrins, glycerin monostearate, poloxamer, povidone, stearyl alcohol and combinations thereof.

Emulsifiers (i.e., surface active substances which promote the suspension of one liquid in another and/or promote the formation of a stable mixture, or emulsion, of oil and water) that can be included in the composition can be selected from, but are not limited to, metallic soaps, animal and vegetable oils, acacia, anionic emulsifying wax, calcium stearate, carbomers, cetostearyl alcohol, cetyl alcohol, cholesterol, diethanolamine, ethylene glycol palmitostearate, glycerin monostearate, glyceryl monooleate, hydroxpropyl cellulose, hypromellose, lanolin, hydrous, lanolin alcohols, lecithin, medium-chain triglycerides, methylcellulose, mineral oil and lanolin alcohols, monobasic sodium phosphate, monoethanolamine, nonionic emulsifying wax, oleic acid, poloxamer, poloxamers, polyoxyethylene alkyl ethers, polyoxyethylene castor oil derivatives, polyoxyethylene sorbitan fatty acid esters, polyoxyethylene stearates, propylene glycol alginate, self-emulsifying glyceryl monostearate, sodium citrate dehydrate, sodium lauryl sulfate, sorbitan esters, stearic acid, sunflower oil, tragacanth, triethanolamine, xanthan gum, glycerol stearate and combinations thereof.

In exemplary embodiments, the topical pharmaceutical composition is formulated as a liquid. Liquid dosage forms of the topical pharmaceutical composition can include diluents such as, for example, alcohols, glycols, oils, and water. Liquid dosage forms of the topical pharmaceutical composition can also include one or more surfactants, emulsifiers, emulsion stabilizers, buffers, and other excipients.

In some embodiments, the topical pharmaceutical composition is formulated as oil-in-water or water-in-oil emulsion, cream or ointment. A cream can be a water-in-oil (w/o) emulsion in which an aqueous phase is dispersed in an oil phase, or an oil-in-water (o/w) emulsion in which an oil is dispersed within an aqueous base. Creams of the topical pharmaceutical composition can contain emulsifying agents and/or other stabilizing agents. In exemplary embodiments, the topical pharmaceutical composition is a cream having a viscosity of greater than 1000 centistokes, or a viscosity in the range of about 20,000-50,000 centistokes. An ointment generally refers to a more viscous oil-in-water cream. Ointment bases (i.e. carriers) that can be used in the composition include, but are not limited to, hydrocarbons (petrolatum, beeswax) vegetable oils, fatty alcohols (cholesterol, lanoilin, wool alcohol, stearyl alcohol) or silicones. Insoluble solids such as starch, zinc oxide, calcium carbonate, or talc can also be used in embodiments wherein the composition is formulated as an ointment or cream.

In exemplary embodiments, the topical pharmaceutical composition is formulated as a lotion. A "lotion", as used herein, is a low- to medium-viscosity liquid composition. A lotion can contain finely powdered substances that are in soluble in the dispersion medium through the use of suspending agents and dispersing agents. Alternatively, lotions can have, as the dispersed phase, liquid substances that are immiscible with a vehicle and can dispersed by means of emulsifying agents or other suitable stabilizers. In exemplary embodiments, topical pharmaceutical composition is a lotion in the form of an emulsion having a viscosity of between 100 and 1000 centistokes. The fluidity of lotions permits rapid and uniform application over a wide surface area.

In exemplary embodiments, the topical pharmaceutical composition is formulated as a gel. Gel forms of the topical pharmaceutical composition can include a lipophilic component, an aqueous component or both. In exemplary embodiments, the topical pharmaceutical composition includes one or more gelling agents selected from, but not limited to, modified celluloses, such as hydroxypropyl cellulose and hydroxyethyl cellulose; carbopol homopolymers and copolymers; and combinations thereof. In exemplary embodiments, the topical pharmaceutical composition is formulated as a gel and includes one or more liquid vehicles selected from, but not limited to, diglycol monoethyl ether; alklene glycols, such as propylene glycol; dimethyl isosorbide; alcohols, such as isopropyl alcohol, ethanol and combinations thereof. The solvents can be selected for their ability to dissolve the other components included in the gel formulation. Other additives can be included in the gel dosage forms of the compositions, such as, but not limited to, isopropyl myristate, ethyl acetate, $C_{12}$-$C_{15}$ alkyl benzoates, mineral oil, squalane, cyclomethicone, capric/caprylic triglycerides, or combinations thereof.

Gel forms of the compositions can be formed by the entrapment of large amounts of aqueous or aqueous-alcoholic liquids in a network of polymers or of colloidal solid particles. Such polymers or colloids (gelling or thickening agents) can be present at concentrations of less than 10% w/w and include, but are not limited to, carboxymethyl cellulose, hydroxypropylmethyl cellulose, hydroxyethyl cellulose, methyl cellulose, sodium alginate, alginic acid, pectin, tragacanth, carrageen, agar, clays, aluminum silicate, carbomers, and combinations thereof.

In exemplary embodiments, the topical pharmaceutical composition is formulated as an aerosol. Aerosol dosage forms of the composition can include one or more propellants such as, but not limited to, dichlorodifluoromethane, trichlorofluoromethane, dichlorotetrafluoroethane, carbon dioxide, or other suitable gas, and/or one or more co-solvents such as, but not limited to, ethanol, acetone, hexadecyl alcohol, and combinations thereof.

In exemplary embodiments, the topical pharmaceutical composition includes one or more vitamins, cosmetic peptides, oil control agents, and/or other skin care agents.

Vitamins that can be included in the topical pharmaceutical composition include, but are not limited to, vitamin D, vitamin K, vitamin B (including niacinamide, nicotinic acid, $C_{1-18}$ nicotinic acid esters, and nicotinyl alcohol; B6 compounds, such as pyroxidine; and B5 compounds, such as panthenol, or "pro-B5"), vitamin A (including retinoids such as retinyl propionate, carotenoids, and other compounds), vitamin E (including tocopherol sorbate, tocopherol acetate, other esters of tocopherol), vitamin C (including ascorbyl esters of fatty acids, and ascorbic acid derivatives, for example, ascorbyl glucoside, magnesium ascorbyl phosphate, sodium ascorbyl phosphate, and ascorbyl sorbate), and all natural and/or synthetic analogs thereof, and combinations thereof. In exemplary embodiments, the composition includes about 0.0001% w/w to about 50% w/w, about 0.001% w/w to about 10% w/w, about 0.01% w/w to about 5% w/w, or about 0.1% w/w to about 1% w/w, or any individual concentration or range of concentrations falling within the above concentrations of one or more vitamins.

Cosmetic peptides that can be included in the topical pharmaceutical composition include, but are not limited to, di-, tri-, tetra-, penta-, and hexa-peptides, their salts, isomers, derivatives, and mixtures thereof. Examples of useful peptide derivatives include, but are not limited to, peptides derived from soy proteins, palmitoyl-lysine-threonine (pal-KT) and palmitoyl-lysine-threonine-threonine-lysine-serine (MATRIXYL®) palmitoyl-glycine-glutamine-proline-arginine (RIGIN®), these three being available from Sederma, France, and Cu-histidine-glycine-glycine (Cu-HGG, also known as IAMIN®), and naturally occurring and synthesized derivatives thereof, and combinations thereof. In exemplary embodiments, the composition includes about $1\times10^{-7}$% w/w to about 20% w/w, about $1\times10^{-6}$% w/w to about 10% w/w, about $1\times10^{-5}$% w/w to about 5% w/w, or any individual concentration or range of concentrations falling within the above concentrations of one or more cosmetic peptides.

Oil control agents that can be included in the topical pharmaceutical composition include, but are not limited to, salicylic acid, dehydroacetic acid, benzoyl peroxide, vitamin B3 (for example, niacinamide), their isomers, esters, salts and derivatives, and mixtures thereof. In exemplary embodiments, the composition includes about 0.0001% w/w to about 15% w/w, about 0.01% w/w to about 10% w/w, about 0.1% w/w to about 5% w/w, about 0.2% w/w to about 2% w/w, or any individual concentration or range of concentrations falling within the above ranges of one or more oil control agents.

Other skin care agents that can be included in the topical pharmaceutical composition include, but are not limited to, retinol, steroids, sunblock, salicylate, minocycline, antifungals, peptides, antibodies, lidocaine, N-acyl amino acid compounds (including, for example, N-acyl phenylalanine, N-acyl tyrosine, and their isomers, including their D and L isomers) along with their salts and derivatives, and combinations thereof. An exemplary N-acyl amino acid compound is N-undecylenoyl-L-phenylalanine (commercially available under the tradename SEPIWHITE®). Other skin active agents such as Lavandox, Thallasine 2, Argireline NP, Gatuline In-Tense and Gatuline Expression, Myoxinol LS 9736, Syn-ake, and Instensyl®, Sesaflash™, N-acetyl D-glucosamine, panthenol (for example, DL panthenol available from Alps Pharmaceutical Inc.), tocopheryl nicotinate, benzoyl peroxide, 3-hydroxy benzoic acid, flavonoids (for example, flavanone, chalcone), farnesol, phytantriol, glycolic acid, lactic acid, 4-hydroxy benzoic acid, acetyl salicylic acid, 2-hydroxybutanoic acid, 2-hydroxypentanoic acid, 2-hydroxyhexanoic acid, cis-retinoic acid, trans-retinoic acid, retinol, retinyl esters (for example, retinyl propionate), phytic acid, N-acetyl-L-cysteine, lipoic acid, tocopherol and its esters (for example, tocopheryl acetate: DL-a-tocopheryl acetate available from Eisai), azelaic acid, arachidonic acid, tetracycline, ibuprofen, naproxen, ketoprofen, hydrocortisone, acetominophen, resorcinol, phenoxyethanol, phenoxypropanol, phenoxyisopropanol, 2,4,4'-trichloro-2'-hydroxy diphenyl ether, 3,4,4'-trichlorocarbanilide, octopirox, lidocaine hydrochloride, clotrimazole, miconazole, ketoconazole, neomycin sulfate, theophylline, and mixtures thereof can also be included within the composition. Additional skin care agents that can be included in the composition are disclosed in US Publication No. 2007/0020220A1, wherein the components/ingredients are incorporated herein by reference in their entirety.

In exemplary embodiments, the topical pharmaceutical composition includes one or more skin lightening agents, such as, but not limited to, ascorbic acid compounds, vitamin B3 compounds, azelaic acid, butyl hydroxyanisole, gallic acid and its derivatives, glycyrrhizinic acid, hydroquinone, kojic acid, arbutin, mulberry extract, and mixtures thereof.

In exemplary embodiments, the topical pharmaceutical composition includes one or more sunblock agents such as, but not limited to, para-aminobenzoic acid (PABA), PABA esters (glyceryl PABA, amyldimethyl PABA and octyldimethyl PABA), benzophenones (oxybenzone and sulisobenzone), cinnamates (octylmethoxy cinnamate and cinoxate), salicylates (homomethyl salicylate) anthranilates, $TiO_2$, avobenzone, bemotrizinol, bisoctrizole, 3-(4-methylbenzylidene)-camphor, cinoxate, diethylamino hydroxybenzoyl hexyl benzoate, dioxybenzone, drometrizole trisiloxane, ecamsule, ethylhexyl triazone, homosalate, menthyl anthranilate, octocrylene, octyl salicylate, iscotrizinol, isopentenyl-4-methoxycinnamate, octyl-dimethyl-p-aminobenzoic acid, octyl-methoxycinnamate, oxybenzone, polysilicone-15, trolamine salicylate, ZnO and combinations thereof.

In exemplary embodiments, the topical pharmaceutical composition is a hydrogel. Hydrogel dosage forms of the topical pharmaceutical composition can be prepared by cross-linking various monomers and/or polymers to provide a three-dimensional polymer network. Non-limiting examples of cross-linkable polymers include, but are not limited to, polyoxyethylene-polypropylene block copolymers, ionic poly saccharides, such as chitosan or sodium alginate, cellulose, and biodegradable polymers, such as poly-lactides (PLA) and poly-glycolides (PGA), butylene succinate (PBS), polyhydroxyalkanoate (PHA), polycaprolactone acid lactone (PCL), polyhydroxybutyrate (PHB), glycolic amyl (PHV), PHB and PHV copolymer (PHBV), and poly lactic acid (PLA)-polyethylene glycol (PEG) copolymers (PLEG).

In exemplary embodiments, the topical pharmaceutical composition contains one or more penetration or permeation enhancers for transdermal drug delivery. Non-limiting examples of penetration or permeation enhancers include chemical permeation enhancers (CPEs) such as, but not limited to, solvents (e.g., monohydric alcohols such as methanol, ethanol, propanol, isopropanol), fatty acids (e.g., oleic acid, caprylic acid), fatty alcohols (e.g. lauryl alcohol, myristyl alcohol, oleyl alcohol), surfactants (e.g., ionic or non-ionic detergents), fatty acid esters (e.g. isopropyl myristate, isopropyl palmitate, methylpropionate, and ethyl oleate), organic acids (e.g. salicylic acid and salicylates, citric acid and succinic acid), nitrogenous compounds (e.g. urea), bile salts and derivatives, micelles/liposomes or micelle-forming or liposome-forming components (e.g., phospholipids), sulfoxides, terpenes and terpenoids, polyols, urea and derivatives, and chelating agents. A non-limiting list of CPEs can also include methanol, ethanol, propylene glycol, ethylene glycol, glycerol, butanediol, polyethylene glycol, polyethylene glycol monolaurate, diethylene glycol, monoethyl ether (transcutol), oleic acid, caprylic acid, menthol, nerol, camphor, methyl salicylate, sodium laurate, sodium lauryl sulfate, cetyltrimethylammonium bromide, benzalkonium chloride, poloxamer (231, 182, 184), Tween (20, 40, 60, 80), sodium dodecyl sulfonate (SDS), methylsulfonylmethane (MSM), benzalkonium chloride, polyoxyl 40 hydrogenated castor oil, didecyldimethylammonium bromide (DDAB), didecyltrimethylammonium bromide (DTAB), polysorbates, Na glyacolate, Na deoxycholate, EDTA, citric acid, dimethylacetamide (DMA), DMSO, dimethylformamide (DMF), dimethylsulfoxide, decylmethylsulfoxide, propylene glycol, polyethylene glycol, glycerol, 2-pyrrolidone, 1-methyl-2-pyrrolidone, ethanolamine, diethanolamine, triethanolamine urea, lecithin, terpenes, terpenoids, 1-substituted azacycloheptan-2-ones, such as 1-n-dodecylcyclazacycloheptan-2-one phospholipids, water, and combinations thereof. More permeation enhancers that can be used in the composition are those disclosed in, for example, Williams et al., "Penetration enhancers," Adv. Drug Deliv. Rev. 2004 Mar. 27; 56 (5): 603-18; and Pathan et al., "Chemical Penetration Enhancers for Transdermal Drug Delivery System," Trop. J. Pharma. Res., April 2009; 8 (2): 173-179, the contents of which are incorporated herein by reference in their entireties.

In exemplary embodiments, the topical pharmaceutical composition contains about 0.1% w/w to about 15% w/w, about 2% w/w to about 12% w/w, about 4% w/w to about 10% w/w, about 4% w/w to about 7% w/w, about 4% w/w to about 6% w/w, about 4.5% w/w to about 5.5% w/w, about 4% w/w to about 5% w/w, or any range or individual concentration falling within the above ranges of one or more penetration or permeation enhancers.

One or more of the penetration or permeation enhancers that can be included in the composition can be a non-ionizable glycol ether. Non-ionizable glycol ethers include, but are not limited to, diethylene glycol monomethyl ether, triethylene glycol monomethyl ether, polyethylene glycol monomethyl ether, ethylene glycol monoethyl ether, diethylene glycol monoethyl ether, triethylene glycol monoethyl ether, ethylene glycol monoisopropyl ether, ethylene glycol monobutyl ether, diethylene glycol monobutyl ether, triethylene glycol monobutyl ether, ethylene glycol monoisobutyl ether, diethylene glycol monohexyl ether, ethylene glycol mono 2-ethylhexyl ether, diethylene glycol mono 2-ethylhexyl ether, ethylene glycol monoallyl ether, ethylene glycol monophenyl ether, ethylene glycol monobenzyl ether, diethylene glycol monobenzyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, propylene glycol monophenyl ether, ethylene glycol dimethyl ether, diethylene glycol dimethyl ether, triethylene glycol dimethyl ether, diethylene glycol diethyl ether, diethylene glycol dibutyl ether, dipropylene glycol dimethyl ether, and combinations thereof. The glycol portion of these non-ionizable glycol ethers can include a broad range of chemicals including, but not limited to, propylene glycol, dipropylene glycol, butylene glycol, and polyethyleneglycols having a general formula of HOCH2(CH2OH)nCH2OH, where n (number of oxyethylene groups) is 4-200. In exemplary embodiments, the non-ionizable glycol ether is a diethylene glycol monoethyl ether ("DEGEE" or "ethoxydiglycol" known under its trade name TRANSCUTOL®, commercially available from Gattefosse, Paramus, N.J).

In exemplary embodiments, the topical pharmaceutical composition contains about 0.01% w/w to 50% w/w, about 0.5% w/w to about 10% w/w, about 1% w/w to about 25% w/w, about 2% w/w to about 20% w/w, about 4% w/w to about 10% w/w, about 4% w/w to about 8% w/w, about 4% w/w to about 5% w/w, or any range or individual concentration falling within the above ranges of one or more non-ionizable glycol ethers.

One or more of the penetration or permeation enhancers that can be included in the composition can be a peptide or protein fragment. Such peptides and protein fragments can be classified as "skin penetrating peptides" (SPPs) or cell penetrating peptides (CPPs). SPPs can stabilize structural proteins in the skin rather than denaturing them. For example, SPPs bind to keratin proteins through hydrogen bonds and weak electrostatic interactions and can operate as binding mediators between keratin and drug molecules. SPPs can also utilize pathways between corneocytes via diffusion of a drug via gaps between cells as well as through lipid bilayers, without disruption. An example of a SPP is TD-1, which is known to loosen the desmosome-induced tight junctions between corneocytes with a change in the space between cells from about 30 nm to about 466 nm in 30 minutes from topical application. The cell gaps increase and then gradually are restored in 1 hour after treatment with TD-1. Various SPPs are known in the art and numerous peptides containing 9 to 19 amino acids have been shown to exhibit skin penetrating activity. Embodiments encompass all such peptides.

In exemplary embodiments, the topical pharmaceutical composition contains one or more fragrance-inducing compounds. As used herein, a "fragrance-inducing compound" is a chemical that provides the topical pharmaceutical composition a specific aroma. The fragrance-inducing compound can be selected from, but is not limited to, ethyl acetate, benzaldehyde, ethyl maltol, limonene, kashmirin, and acetone. In exemplary embodiments, the topical pharmaceutical composition contains one or more fragrance-inducing compounds that provide the topical pharmaceutical composition an aroma or scent selected from, but not limited to, tropical, sage, peppermint, lemon, *eucalyptus*, bergamot, tea tree, lemongrass, grapefruit, coconut, vanilla, lavender, bay rum, cedarwood, musk, vetiver, pine, black pepper, and sandalwood. Those of ordinary skill in the art readily understand what chemicals and essential oils are capable of achieving the above exemplified aromas and scents, and are readily capable of blending those fragrance-inducing compounds with other components of the topical pharmaceutical composition.

In exemplary embodiments, the topical pharmaceutical composition is in the form of a transdermal patch. The transdermal patch can be in any conventional form such as, but not limited to, a strip, a gauze, or a film. The transdermal patch can contain nonwoven or woven (e.g., gauze dressing) material. The transdermal patch can contain laminated layers. The transdermal patch can be nonocclusive or occlusive, with the latter being preferred, but not required, for backing layers. The transdermal patch can be hermetically sealed for storage (e.g., foil packaging). The transdermal patch can be held onto the skin and components of the patch can be held together using various adhesives. For example, the transdermal patch can be in the form of a band-aid type device, or it may be packaged in a small metal or plastic "cup", which is strapped onto an appropriate site using an adhesive, tape, or an outer fabric or leather strap, similar to that worn as part of a watch. The transdermal patch be disposable or can be refillable/reusable.

The transdermal patch can be made of any polymeric material, non-limiting examples including ethylene vinyl acetate (EVA) copolymer, crosslinked poly(vinyl alcohol), poly(hydroxy ethylmethacrylate), acyl substituted cellulose acetates, hydrolyzed alkylene-vinyl acetate copolymers, polyvinyl chloride, polyvinyl acetate, polyvinyl alkyl ethers, polyvinyl fluoride, polycarbonate, polyurethane, polyamide, polysulphones, styrene acrylonitrile copolymers, crosslinked poly(ethylene oxide), poly(alkylenes), poly(vinyl imidazole), poly(esters), poly(ethylene terephthalate), polyphosphazenes, chlorosulphonated polyolefines, poly-lactides (PLA), poly-glycolides (PGA), and combinations thereof.

In exemplary embodiments, the transdermal patch contains a hydrogel. In other exemplary embodiments, the transdermal patch includes additional components such as, but not limited to, binders, buffers, colorings, desiccants, diluents, humectants, preservatives, stabilizers, other excipients, adhesives, plasticizers, tackifiers, thickeners, cooling agents, and combinations thereof.

Another aspect of the present disclosure is a method of treating a disorder, skin condition, topical injury and/or pain, the method including administering any topical pharmaceutical composition disclosed herein.

As used herein, the terms "administer," "administering" or "administration" refer to either directly administering a compound, a pharmaceutically acceptable salt of the compound or a composition to a subject.

The phrase "pharmaceutically acceptable" is employed herein to refer to those agents of interest/compounds, salts, compositions, dosage forms, which are—within the scope of sound medical judgment-suitable for use in contact with the tissues of human beings and/or other mammals without excessive toxicity, irritation, allergic response, or other problem or complication, commensurate with a reasonable benefit/risk ratio. In exemplary embodiments, "pharmaceutically acceptable" means approved by a regulatory agency of the federal or a state government, or listed in the U.S. Pharmacopeia or other generally recognized pharmacopeia for use in mammals (e.g., animals), and more particularly, in humans.

As used herein, the term "salts" embraces pharmaceutically acceptable salts commonly used to form alkali metal salts of free acids and to form addition salts of free bases. The nature of the salt is not critical, provided that it is pharmaceutically acceptable. The term "salts" also includes solvates of addition salts, such as hydrates, as well as polymorphs of addition salts. Suitable pharmaceutically acceptable acid addition salts can be prepared from an inorganic acid or from an organic acid. Non-limiting examples of such inorganic acids are hydrochloric, hydrobromic, hydroiodic, nitric, carbonic, sulfuric, and phosphoric acid. Appropriate organic acids can be selected from aliphatic, cycloaliphatic, aromatic, arylaliphatic, and heterocyclyl containing carboxylic acids and sulfonic acids, for example formic, acetic, propionic, succinic, glycolic, gluconic, lactic, malic, tartaric, citric, ascorbic, glucuronic, maleic, fumaric, pyruvic, aspartic, glutamic, benzoic, anthranilic, mesylic, stearic, salicylic, p-hydroxybenzoic, phenylacetic, mandelic, embonic (pamoic), methanesulfonic, ethanesulfonic, benzenesulfonic, pantothenic, toluenesulfonic, 2-hydroxyethanesulfonic, sulfanilic, cyclohexylaminosulfonic, algenic, 3-hydroxybutyric, galactaric and galacturonic acid.

As used herein, the term "patient" and "subject" are interchangeable and may be taken to mean any living organism which can be treated with compositions of the present disclosure. As such, the terms "patient" and "subject" can include, but are not limited to, any non-human mammal, primate or human. In exemplary embodiments, the "patient" or "subject" is a mammal, such as mice, rats, other rodents, rabbits, dogs, cats, swine, cattle, sheep, horses, primates, or humans. In exemplary embodiments, the patient or subject is an adult, child or infant.

As used herein, the term "treating" includes the administration of a compound or composition which reduces the frequency of, or delays the onset of, symptoms of a medical condition or enhances the texture, appearance, color, sensation, or hydration of an intended tissue treatment area of the tissue surface in a subject relative to a subject not receiving the compound or composition. This can include reversing, reducing, or arresting the symptoms, clinical signs, and underlying pathology of a condition in a manner to improve or stabilize a subject's condition.

In exemplary embodiments, the administering of the topical pharmaceutical composition includes administering the topical pharmaceutical composition to a surface tissue. The administration to the surface tissue can be either topical, transdermal, percutaneous, or via microneedle injection.

As used herein, a "surface tissue" includes any tissue surface such as, but not limited to, skin, mucosa, eyes, ears, inside the nose, inside the mouth, lips, urethral openings, vagina, anus, tongue, frenulum of tongue, hair/scalp, teeth, bone, lacrimal glands, sinus mucosa, respiratory tract, gums, feet and other lower body appendages (e.g., legs), and penis. In exemplary embodiments, the surface tissue is a skin surface or a mucosal surface. In other exemplary embodiments, the surface tissue is a mucosal surface on the eye. In further exemplary embodiments, the surface tissue is a mucosal surface located in an oral cavity or a vaginal cavity.

In exemplary embodiments, the method is used to treat and/or alleviate pain from a skin condition in a subject. The skin condition can be, but is not limited to, acne, psoriasis, atopic dermatitis, rosacea and combinations thereof. In exemplary embodiments, the skin condition is a benign neoplasm, premalignancy or malignancy, a Human Papilloma Virus induced lesion (e.g. warts, common warts, palmoplantar warts, flat warts, epidermodysplasia verruciformis related warts, anogenital warts, condyloma *acuminatum*); Herpesvirus related lesions including those induced by HHV-1 (HSV-1), HHV-2 (HSV-2), HHV-3 (varicella-zoster virus) (e.g. chicken pox, Herpes zoster, shingles); Poxvirus induced lesions, molluscum contagiosum, orf, callus, cutaneous horns, corns, acrochordons, fibroepithelial polyps, prurigo nodularis, actinic keratoses, squamous cell carcinoma, squamous cell carcinoma in situ, keratoacanthoma, basal cell carcinoma, cutaneous lymphomas and benign lymphocytic infiltrates and hyperplasias of the skin, clear cell acanthoma, large cell acanthoma, epidermolytic acanthoma, porokeratosis, hyperkeratosis, lichenoid keratosis, acanthosis, acanthosis *nigricans*, confluent and reticulated papillomatosis, nevi, including e.g. dermal nevi, epidermal nevi, compound nevi, ILVEN (inflammatory linear verrucous epidermal nevi), nevus sebaceous, nevus comedonicus; acne (e.g. comedonal acne, inflammatory acne, papular acne, pustular acne, cystic acne); cysts (e.g. epidermoid cysts, milia, trichilemmal cysts, follicular cysts, proliferating cysts, dermoid cysts, pilonidal cysts, apocrine cysts, eccrine cysts, sebaceous cysts, mucous cysts, myxoid cysts, ganglion cysts, synovial cysts, vellus hair cysts, steatocystoma, hidrocystoma); adnexal neoplasms (e.g. trichofolliculoma, fibrofolliculoma, perifollicular fibroma, trichodiscoma, nevus sebaceous, chondroid syringoma, trichoepithelioma, trichoblastoma, desmoplastic trichoepithelioma, pilomatricoma, pilomatrical carcinoma, tricholemmoma, trichelemmal carcinoma, tumor of the follicular infundibulum, tricoadenoma, proliferating pilar tumor, sebaceous hyperplasia, sebaceous adenoma, sebaceous epithelioma, sebaceous carcinoma, syringoma, poroma, hidradenoma, apocrine hidradenoma, spiradenoma, cylindroma, eccrine nevus (eccrine hamartoma), papillary adenoma, papillary adenocarcinoma); Benign melanocytic neoplasms (e.g. ephilides, café-au-lait macules, Becker's melanosis, lentigines, solar lentigines, lentigo simplex, mucosal melanocytic lesions, Mongolian spots, Nevus of Ota, blue nevus, common acquired melanocytic nevi (nevocellular nevus, "moles"), congenital nevi, nevus spilus, recurrent nevi); vascular and perivascular neoplasms and reactive hyperplasias (e.g., hemangiomas, cherry angiomas, hobnail hemangiomas (targeted hemosiderotic hemangiomas), tufted angiomas, hemangioendotheliomas, angiolymphoid hyperplasia with eosinophilia (ALHE), *Glomus* tumors (glomangiomas), hemangiopericytomas); cutaneous neural and neuroendocrine neoplasms (e.g. neuromas, Schwannomas, neurofibromas, nerve sheath tumor, nerve sheath myxoma, neurothekeoma, granular cell tumor); fibrotic and fibrohistiocytic proliferations (e.g. acrochordons, fibroepithelial polyps, fibromas, fibrous papules, angiofibromas, pearly penile papules, periungual fibromas, dermatofibromas, fibrokeratomas, sclerotic or pleomorphic fibromas, connective tissue nevi); cutaneous scars, hyperplasias, keloids, rosacea, cutaneous fungal, dermatophyte and mold infections, onychomycosis, hyperpigmentation, rhytides, psoriasis, malignant melanoma, seborrheic keratosis, seborrheic keratosis variants including e.g. dermatosis papulosis nigra, inverted follicular keratosis/keratoma warty dyskeratosis/warty dyskeratoma, acrokeratosis verruciformis, stucco keratosis; or any combination thereof.

In exemplary embodiments, the method is used to treat pain caused by one or more of severe spinal stenosis, spinal surgery, post-laminectomy, adhesive capsulitis, arthritis, neuroma, bursitis, spondylosis, spasms (e.g., muscle or cervical spasms), lumbar "post-laminectomy" pain syndrome, idiopathic neuropathy, and/or degrading joints (e.g., sacroiliac joint pain).

In exemplary embodiments, the method is used to treat and/or alleviate pain from scars and/or wrinkles on a skin surface.

In exemplary embodiments, the method is used to treat various conditions, such as, but not limited to, chronic pain, acute pain, a sprain, a muscle strain (e.g., a sports injury), post-operative pain, urinary incontinence, neurological disorders (Alzheimer's, dementia, Parkinson's, restless leg syndrome, depression, neuropathic pain, schizophrenia, sleep disturbance, cognitive disorder), angina, coronary heart disease, COPD, nausea, motion sickness, contraceptive, hormonal therapy, arthritis, osteoarthritis, rheumatoid arthritis, inflammatory bowel disease, addiction, ADHD, anti-inflammatory conditions, skin disorders, breast cancer, erectile dysfunction, vitamin deficiency, calcium deficiency, diabetes, diabetic neuropathy, diabetic foot, post-menopause symptoms, hot flashes, hormone replacement therapy, migraine, herpes infection, gingival inflammation, renal failure, Tinnitus, tennis elbow, tendonitis, lipolysis, carpal tunnel syndrome, hypogonadism, avascular necrosis, induction of labor, peripheral neuropathic pain, spinal cord injury, oral mucositis, oral pain (e.g., gum tissue pain, tooth pain), post-surgery pain and hypertension.

Suitable sites for administering the composition can include, but are not limited to, the skin, bronchium, gastrointestinal tract, eye, buccal cavity, and ear. In exemplary embodiments, the compositions disclosed herein can be administered to any solid tissue via a needle. Such tissues include, but are not limited to, liver tissue, lung tissue, tissues of the GI tract, muscle tissue, nervous tissue, bone, and buccal tissue.

In exemplary embodiments, the method includes cleaning the surface tissue at the site of administration before and/or after the administrating step.

In exemplary embodiments, the method includes administering the composition one or more times each day for a period of at least 1 month, 2 months, 3 months, 4 months, 6 months, 8 months or 12 months. In exemplary embodiments, the period can be more than 12 months if the subject suffers from a chronic condition.

In exemplary embodiments, the composition is administered once daily, twice daily, three times a day, once a week, twice a week, every other week, or every other day. The dosing cycle of the composition can include administration for about 1 week, about 2 weeks, about 3 weeks, about 4 weeks, about 5 weeks, about 6 weeks, about 7 weeks, about 8 weeks, about 9 weeks, or about 10 weeks. In exemplary embodiments, the method includes administrating the composition in two cycles, wherein a period of time passes between the first cycle and the second cycle. The period of time between the two cycles can be about 1, 2, 3, 4, 5, 6, 7, 8, 9, 10, 11, or 12 weeks. In exemplary embodiments, the method includes administering the composition on a treatment regime that includes 1, 2, 3, 4, 5, or 6 cycles, wherein each cycle can be spaced apart by approximately 1, 2, 3, 4, 5, 6, 7, 8, 9, 10, 11, or 12 weeks.

In exemplary embodiments, the method includes, prior to administering the composition to a tissue surface, ablating the tissue surface by electromagnetic radiation, laser, dermal abrasion, chemical peel, ultrasound, heating, cooling, and/or by a needle. Abrasion of the outer layer or epidermis of the skin (dermal abrasion) can be desirable to smooth or blend scars, blemishes, or other skin conditions that can be caused by, for example, acne, sun exposure, and aging.

In exemplary embodiments, the method includes, prior to administering the composition to a tissue surface, ablating the tissue surface by electromagnetic radiation. The electromagnetic radiation can involve the use of a fractional laser that employs an electromagnetic radiation (EMR) having one or more wavelengths of between approximately 1,850 to 100,000 nanometers and with pulse widths of between approximately 1 femtosecond ($1 \times 10^{-15}$ s) to 10 milliseconds ($10 \times 10^{-3}$ s) with fluence in the range of from approximately 1 J/cm$^2$ to 300 J/cm$^2$. In other exemplary embodiments, the tissue surface is ablated with electromagnetic radiation having one or more wavelengths of between approximately 2,200 to 5,000 nanometers or between approximately 190 to 320 nanometers with fluence in the range of from 1 J/cm$^2$ to 300 J/cm$^2$.

Examples

The present disclosure will be described in more detail with reference to the following Examples, which shows exemplary embodiments in accordance with the present disclosure. The present disclosure is not limited to these exemplary embodiments.

Example 1: WAXS Analysis of Trolamine Salicylate Formulations

An exemplary formulation containing trolamine salicylate saturated in 20% propylene glycol was placed in a sample holder of a two-circle goniometer, enclosed in a radiation safety enclosure. The X-ray source was a 1 kW Cu X-ray tube λ=1.54060 Å, maintained at an operating current of 40 kV and 25 mA. The X-ray optics were the standard Bragg-Brentano para-focusing mode (wherein the X-ray source and the detector move simultaneously in the opposite direction by the angle θ, and the free surface of the sample is kept horizontally during the measurements) with the X-ray diverging from a DS slit (1 mm) at the tube to strike the sample and then converging at a position sensitive X-ray Detector (Lynx-Eye, Bruker-AXS). The two-circle 218 mm diameter θ-θ goniometer was computer controlled with independent stepper motors and optical encoders for the θ circle with the smallest angular step size of 0.0001° 2θ. The software suit for data collection and evaluation was windows based. Data collection was automated COMMANDER program by employing a DQL file. Data was analyzed by the program EVA. Experimental parameters of the WAXS analysis are given in Table 1.

TABLE 1

| WAXS Experimental Parameters | |
|---|---|
| Wavelength | 1.54060 Å |
| Detector | PSD (Lynx-Eye Bruker AXS) |
| Anti-scatter Slit | 12.530 mm |
| Divergence Slit | 1.00 mm |
| Anti-air-scatter | Knife edge |
| Scan type | Coupled theta/2theta |
| Goniometer radius | 217.5 mm |
| Start | 3.0 |
| End | 110.0 |
| Step Size | 0.03 |
| Total Scan Time | 120 minutes |

Figure 1:
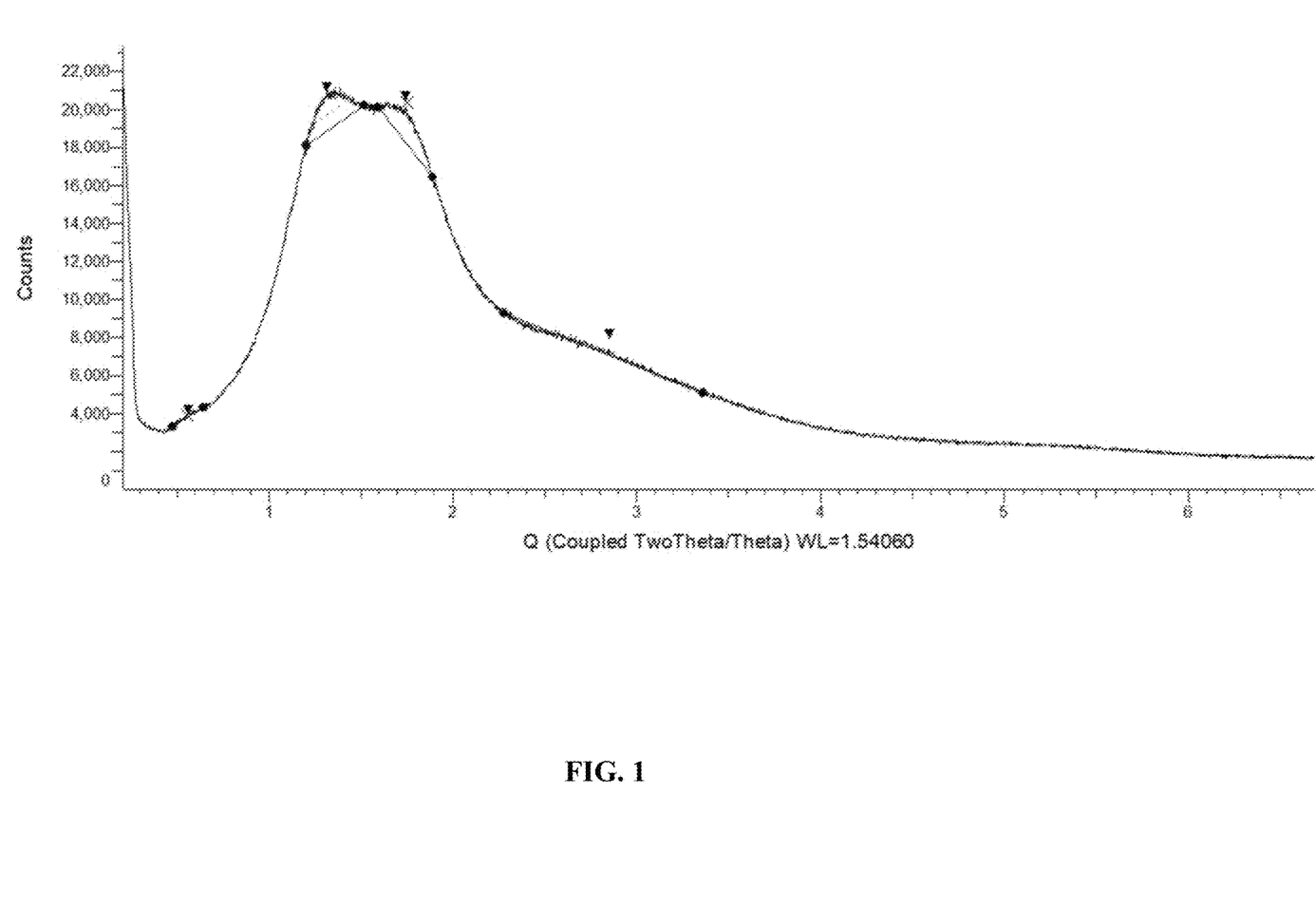
FIG. 1 displays a WAXS spectrum of an exemplary trolamine salicylate formulation.

The WAXS spectrum of the sample is depicted in FIG. 1. The WAXS X-ray scattering pattern for the sample was calculated using the formula:

$$Q = 4\pi \sin(\theta)/\lambda$$

wherein λ is the wavelength of the X-ray, θ is the angle between the plane of the sample and the x-ray source The spectrum displays the WAXS characterization peaks of Form 1 of trolamine salicylate (see Peak 1 and Peak 2). These characterization peaks, in terms of Q, can be found with the ranges of 1.21 to 1.52 (±0.16) Å$^{-1}$ and 1.60 to 1.89 (±0.15) Å$^{-1}$. The area of these peaks was determined by DIFFRAC EVA (see section 7.4 of the Bruker DIFFRAC.SUITE User Manual, pages 139-141).

Figure 2:
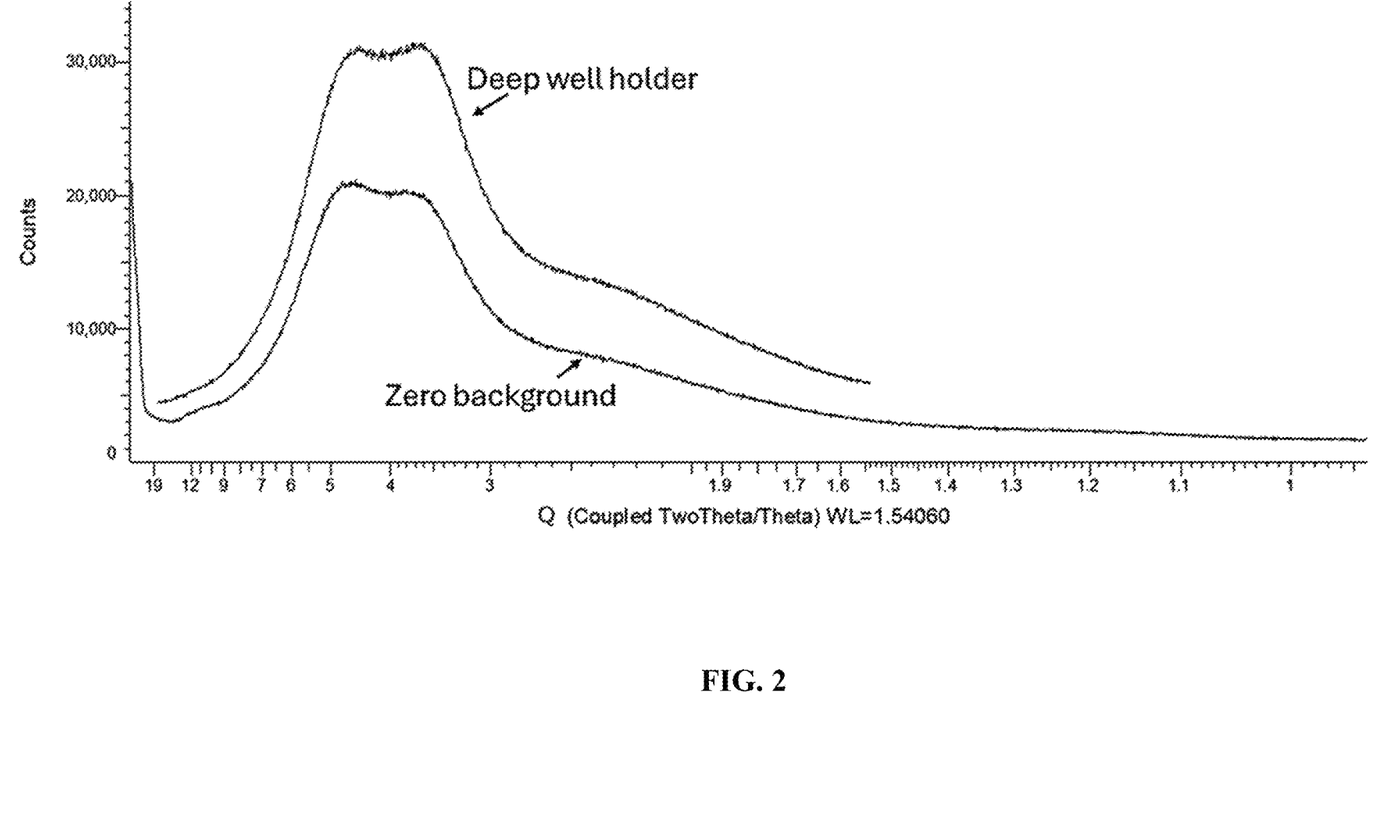
FIG. 2 displays a WAXS spectrum of two exemplary trolamine salicylate formulations that were analyzed under different conditions. One formulation was analyzed in a deep well holder while the other was analyzed in a zero-background holder.

To test for reproducibility of the WAXS spectrum depicted in FIG. 1, two different sample holders were employed. The first sample holder was a deep well holder where the sample fills the well to a set height. The second sample holder was a zero-background holder, where the liquid is placed on the surface of a silicon plate cut along the (510) plane. A silicon single crystal cut along the (510) plane has no Bragg X-ray Diffraction peaks. As seen in FIG. 2, the local maximum of the two samples are the same (save for low Q peak, which could not be measured for the deep well holder). The intensities do differ between the maximum; however, that is to be expected due to the nature of the liquid in a well or as a droplet on a surface.

Figure 3:
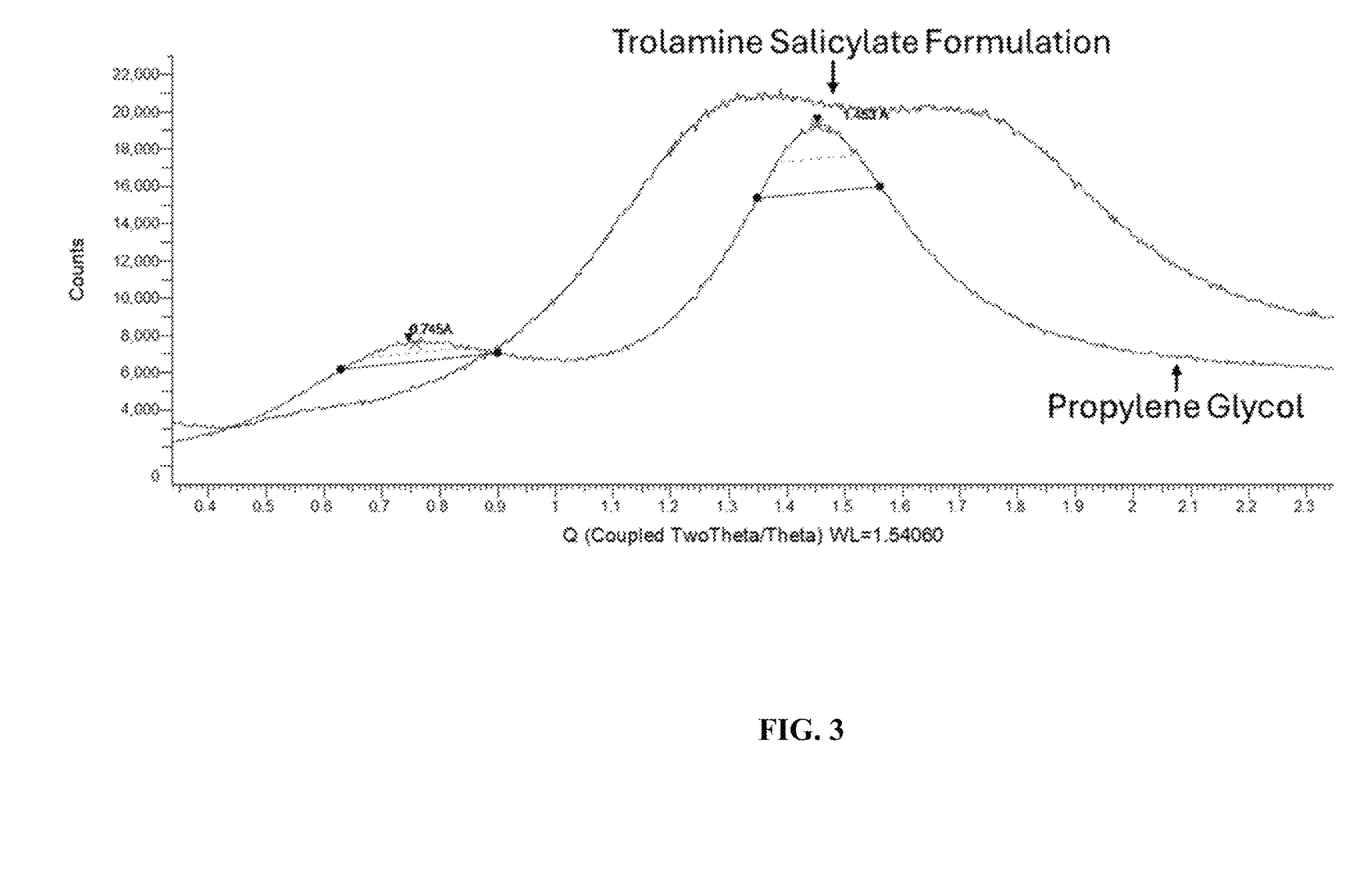
FIG. 3 displays a comparison between a WAXS spectrum of propylene glycol and a WAXS spectrum of an exemplary trolamine salicylate formulation.

A comparison between the WAXS spectrum of propylene glycol and the WAXS spectrum of Form 1 of trolamine salicylate is depicted in FIG. 3. The propylene glycol peaks appear at 0.745 Å$^{-1}$ and 1.453 Å$^{-1}$. By comparison, the WAXS peaks for trolamine salicylate dissolved in 20% propylene glycol (i.e., Form 1) are 1.21 to 1.52 (±0.16) Å$^{-1}$ and 1.60 to 1.89 (±0.15) Å$^{-1}$.

Example 2: Clinical Effects of an Exemplary Trolamine Salicylate Formulation In this example, the efficacy of an exemplary trolamine salicylate formulation to treat or alleviate multiple sources of pain was investigated. The exemplary trolamine salicylate formulation was administered to patients suffering from various degrees of pain and the patients' reactions to the exemplary trolamine salicylate formulation are discussed below.

The exemplary trolamine salicylate formulation used in this example is detailed in Table 2.

TABLE 2

Exemplary Trolamine Salicylate Formulation

| Ingredient | Weight Percentage |
|---|---|
| Triethanolamine Salicylate (i.e., Trolamine Salicylate) | 10 |
| Water (Aqua) | 63.32 |
| Propylene Glycol | 4.2 |
| PEG-12 Glyceryl Dimyristate | 4 |
| Cetyl Alcohol | 2.8 |
| PEG-23 Glyceryl Distearate | 2 |
| Dimethicone | 2 |
| Glyceryl Stearate | 1.768 |
| PEG-100 Stearate | 1.632 |
| Stearyl Alcohol | 1.6 |
| Isopropyl Myristate | 1.5 |
| Caprylic/Capric/Myristic/Stearic Triglyceride | 1.5 |
| Cyclopentasiloxane | 1.0875 |
| Methylsulfonyl Methane | 1 |
| Glycerin | 0.211 |
| Rosmarinus Officinalis (Rosemary) Leaf Extract | 0.198 |
| Lavandula Angustifolia (Lavender) Flower/Leaf/Stem Extract | 0.05 |
| Chamomilla Recutita (Matricaria) Flower Extract | 0.05 |
| Vitis Vinifera (Grape) Seed Extract | 0.001 |
| Jasminum Officinale (Jasmine) Flower Extract | 0.0095 |
| Carthamus Tinctorius (Safflower) Seed Oil | 0.080655 |
| Jasminum Officinale (Jasmine) Oil | 0.00475 |
| Lavandula angustifolia (Lavender) Oil | 0.028 |
| Cyclohexasiloxane | 0.4125 |
| Glucosamine Sulfate | 0.3 |
| Tocopheryl Acetate | 0.250095 |
| Ethylhexylglycerin | 0.175 |
| Phenoxyethanol | 0.826 |
| Linalool | Fragrance Allergen |

Every patient discussed in this example was administered the exemplary trolamine salicylate formulation under "real life" or high-volume medical practice conditions. Patients agreed to test the formulation no reimbursement or inducement to use said formulation. Accordingly, the formulation was administered as part of a non-blinded, perspective, observational case series. The clinical effects that the exemplary formulation had on 25 patients are provided below.

Patient 1 is a 59-year-old female suffering from pain caused by severe spinal stenosis and spinal surgery. Patient 1 applied the exemplary formulation three-times-a-day (TID) every four to six hours. Patient 1 reported to begin experiencing pain relief 15 minutes after applying the exemplary formulation.

Patient 2 is an 81-year-old female suffering from post-laminectomy pain (lumbar). Patient 2 applied the exemplary formulation TID to her lumbar region and reported experiencing pain relief 10 to 15 minutes after administration. Patient 2 reported pain relief for up to six hours after application. Patient 2 previously used topical diclofenac gel and reported no pain alleviation after use. Patient 2 was also unable to tolerate any oral pain medications (e.g., NSAID, or opioids). The ability of the exemplary formulation to provide quick and sustained pain relief to a patient that could not tolerate oral pain medications demonstrates one of the many advantages that the topical formulations disclosed herein can provide.

Patient 3 is a 32-year-old female suffering from right shoulder pain (i.e., adhesive capsulitis). Patient 3 applied the exemplary formulation twice-a-day (BID) to TID to her right shoulder region and reported experiencing immediate pain relief. Patient 3 also reported that she feels as though the pain in her shoulder in almost cured when the exemplary formulation is combined with physical therapy. Before being administered the exemplary formulation, Patient 3 was scheduled to receive a cortisone injection into her right shoulder but cancelled as her symptoms resolved after being administered the exemplary formulation. Patient 3 had previously taken over-the-counter (OTC) pain medications (e.g., Ibuprofen) and reported no to minimum pain alleviation.

Patient 4 is a 46-year-old male suffering from left foot arthritis/neuroma pain. Patient 4 applied the exemplary formulation TID and reported experiencing pain relief within 10 minutes after application.

Patient 5 is a 67-year-old male suffering from right hip/bursitis pain. Patient 5 applied the exemplary formulation BID and reported experiencing pain relief within 10 to 15 minutes after each application.

Patient 6 is a 25-year-old female suffering from right ankle pain. Patient 6 applied the exemplary formulation and reported experiencing pain relief 10 to 15 minutes after application. Patient 6 has previously tried OTC pain medications to alleviate her pain with no to minimum success.

Patient 7 is an 80-year-old female suffering from lumbar spondylosis (LBP, w/o radicular sx) pain. Patient 7 applied the exemplary formulation BID and reported experiencing pain relief with 15 minutes after each application. Patient 7 has a long-standing history of back pain, requiring lumbar RFA procedures every 6-9 months.

Patient 8 is an 80-year-old male suffering from right cervical spondylosis. Patient 8's complex, longstanding cervical pain has required him to receive RFA treatments about once a year. Patient 8 has also previously reported that his pain made it difficult for him to sleep and drive for long hours. Patient 8 applied the exemplary formulation BID and reported experiencing pain relief with 10 minutes after each application. Patient 8 also reported significant pain relief during the night, which led to more restful sleeps, and while driving.

Patient 9 is a 66-year-old male suffering from rheumatoid arthritis of the thumb and wrist. Patient 9 applied the exemplary formulation BID and reported experiencing immediate pain relief that lasted for about 3 to 4 hours.

Patient 10 is a 68-year-old female suffering from low back spasms and myofascial pain. Patient 10 applied the exemplary formulation BID and reported experiencing pain relief with 15 minutes after each application. Patient 10 had previously used other pain alleviation products (e.g., Icy-Hot®, BioFreeze®, lidocaine gel) and reported that the pain alleviation of these products was inferior to the alleviation granted by the exemplary formulation.

Patient 11 is an 81-year-old female suffering from lower back and thoracic pain. Patient 11 applied the exemplary formulation BID and reported experiencing pain relief 15 minutes after each application. Patient 11 cannot take NSAIDS to treat her pain. Accordingly, the exemplary formulation provides Patient 11 with a new, more effective method of treating her pain.

Patient 12 is a 76-year-old man suffering from severe bilateral 1st MCP (thumb) arthritis. Patient 12 has previously had multiple steroid injections into the same area of his hand to help alleviate his pain. Patient 12 applied the exemplary formulation BID to TID and reported experiencing pain relief 5 to 10 minutes after each application. Patient 12 reported that the pain alleviation was so great that he was able to begin playing golf again.

Patient 13 is a 38-year-old female suffering from cervical muscle spasms and myofascial pain. Patient 13 applied the exemplary formulation BID and reported experiencing pain relief 10 to 15 minutes after each application. Patient 13 reported that the pain alleviation she experienced with the exemplary formulation was greater when compared to the pain alleviation she received from massages and trigger point injections.

Patient 14 is a 64-year-old male suffering from lumbar "post-laminectomy" pain syndrome. Patient 14 is a disabled chiropractor that cannot take NSAIDS due to rare blood dyscrasia. Patient 14 relies upon high dosages of opioids to treat pain. Patient 14 applied the exemplary formulation BID to TID and reported rapid pain relief after each application that lasted for 3 to 4 hours. Patient 14 had previously tried multiple other topicals including BioFreeze®, Penetrex® and OTC Voltaren®, and reported that these topicals did not achieve the pain alleviation experienced with the exemplary formulation. Patient 14 also reported that the exemplary formulation has allowed him to reduce his opioid dosages for pain alleviation. This is another significant benefit of the topical formulations disclosed herein given that the United States, and other countries, are currently battling an opioid addiction crisis.

Patient 15 is a 63-year-old male that had a lumbar facet cyst removed and a laminectomy at the end of July 2024. Patient 15 suffers from residual back pain caused by these prior surgeries. Patient 15 applied the exemplary formulation BID to TID and reported experiencing pain relief 10 minutes after each application. Patient 15 has reported that the pain relief provided by the exemplary formulation has allowed him to walk 2 to 3 miles/day, hike and kayak with little to no pain or soreness.

Patient 16 is a 83-year-old female that has experienced 3 complex knee replacement surgeries (had initial TKA with subsequent infection, 2nd TKA a year later which also got infected: eventually had 3rd TKA with plastic surgeon adding a "gastroc" flap; is now 7 years out with no recurrent infection, but experiences residual pain in the scar tissue around the knee and the posterior calf where the flap was taken). Patient 16 applied the exemplary formulation BID to TID and reported experiencing pain relief 10 minutes after each application that lasted for 4 to 6 hours.

Patient 17 is a 60-year-old male that has experienced 5 surgeries on his left foot due to avascular necrosis ("AVN") and suffers from residual, daily pain when standing and resting. Patient 17 applied the exemplary formulation BID to TID and reported experiencing rapid pain alleviation that lasted 3 to 4 hours after each application. Patient 17 has previously tried multiple OTC products, including BioFreeze®, Penetrex®, and Voltaren® and reported little improvement in pain alleviation with those products.

Patient 18 is a 58-year-old male that suffers from left sacroiliac joint pain. Patient 18 applied the exemplary formulation BID and reported experiencing pain alleviation 5 minutes after each application that lasted for 4 to 6 hours.

Patient 19 is a 43-year-old male that suffers from myofascial lower back pain. Patient 19 applied the exemplary formulation BID to TID and reported experiencing immediate pain relief that lasted for several hours after each application.

Patient 20 is a 62-year-old female suffering from residual pain caused by a recent breast reduction surgery. Patient 20 applied the exemplary formulation BID to TID and reported experiencing immediate pain alleviation that lasted for at least 4 hours after each application. After finishing the sample of the exemplary formulation, Patient 20 reported experiencing a 50% reduction in her pain.

Patient 21 is a 72-year-old female suffering from right knee arthritis pain. Patient 21 applied the exemplary formulation TID and reported experiencing pain alleviation 10 minutes after application that lasted for 4 to 6 hours after each application.

Patient 22 is a 48-year-old female that suffers from right shoulder muscle pain with documented arthritis of the glenohumeral joint. Patient 22 applied the exemplary formulation TID and reported experiencing pain alleviation 15 minutes after each application that lasted for about 6 hours.

Patient 23 is an 85-year-old female that suffers from lower neck and shoulder pain. Patient 23 applied the exemplary formulation TID and reported experiencing pain alleviation 15 minutes after each application. Patient 23 cannot take NSAIDS and opioids to manage her pain because of the major side effects she experiences from these compounds. According, the exemplary formulation provides Patient 23 a new, more effective way to alleviate her pain.

Patient 24 is a 90-year-old male that suffers from bursitis outer hip pain. Patient 24 applied the exemplary formulation BID and reported experiencing pain alleviation 10 minutes after each application. Patient 24 previously relied upon bursae injections to manage his outer hip pain but has indicated that he would prefer to use the exemplary formulation to manage his pain.

Patient 25 is a 71-year-old male that suffers from idiopathic neuropathy pain in both feet. Patient 25 applied the exemplary formulation BID and reported experiencing pain alleviation after each application. Despite feeling somewhat frustrated that the exemplary formulation was not able to reverse the numbness caused by his neuropathy, Patient 25 indicated that exemplary formulation was more effective at treating his pain than previous medications he has taken.

Overall, the effects of the exemplary formulation discussed in Example 2 demonstrate the advantageous benefits that the topical pharmaceutical compositions disclosed herein can provide to patients with a long history of pain.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The invention claimed is:

1. A topical pharmaceutical composition comprising:
an effective amount of trolamine salicylate solubilized in propylene glycol,
wherein the trolamine salicylate has Form I, and
wherein the Form 1 has at least two X-ray scattering peaks in terms of Q, which is $4\pi$ times sin ($\theta$) divided by the wavelength (Q=$4\pi$ sin ($\theta$)/$\lambda$), of 1.21 to 1.52 ($\pm 0.16$) $\text{Å}^{-1}$ and 1.60 to 1.89 ($\pm 0.15$) $\text{Å}^{-1}$ at a humidity of 20% or lower.

2. The topical pharmaceutical composition according to claim 1, wherein Form 1 has at least two X-ray scattering peaks, in terms Q which is 4π times sin (θ) divided by the wavelength (Q=4π sin (θ)/λ), of 1.31 (±0.16) Å$^{-1}$ and 1.74 (±0.15) Å$^{-1}$.

3. The topical pharmaceutical composition according to claim 1, wherein the topical formulation provides a pain alleviating effect about 5 minutes after use.

4. The topical pharmaceutical composition according to claim 1, wherein the composition contains about 10.00% w/w trolamine salicylate.

5. The topical pharmaceutical composition according to claim 1, wherein the composition contains about 1.00% w/w to about 4.00% w/w propylene glycol.

6. The topical pharmaceutical composition according to claim 1, wherein the composition contains about 45.00% w/w to about 81.00% w/w purified water.

7. The topical pharmaceutical composition according to claim 1, wherein the composition contains: about 10.00% w/w trolamine salicylate, about 54.00 wt % w/w purified water, about 1.50% w/w isopropyl myristate, about 1.50% w/w caprylic/capric/myristic/stearic triglyceride, about 2.50% w/w dimethicone, about 1.50% w/w cyclomethicone, about 5.00% w/w cetyl alcohol, about 1.00% w/w dimethyl sulfone, about 1.00% w/w glucosamine sulfate, about 3.00% w/w stearyl alcohol, about 1.50% w/w glyceryl monosterate, about 4.00% w/w propylene glycol, about 4.00% wt/wt PEG-12 glyceryl dimyristate, about 2.00% w/w PEG-23 glyceryl disterate, about 2.00% w/w PEG-100 stearate, about 2.00% w/w glyceryl stearate, about 0.25% w/w tocopheryl acetate, about 0.20% w/w rosemary leaf extract, about 0.25% w/w *chamomilla recutita* (*matricaria*) flower extract, about 0.25% w/w lavender extract, about 0.10% w/w grape seed extract, about 1.00% w/w of a fragrant compound or mixture and about 0.80% w/w of a preservative.

8. The topical pharmaceutical composition according to claim 1, wherein the composition contains: about 81.00% w/w purified water, about 10.00% w/w trolamine salicylate, about 2.00% w/w of a rheology modifier, about 1.00% w/w propylene glycol, about 1.00% w/w PEG-12 glyceryl dimyristate, about 3.00% w/w PEG-23 glyceryl disterate, about 1.00% w/w phenoxyethanol and about 1.00% w/w of a fragrant compound or mixture.

9. The topical pharmaceutical composition according to claim 1, wherein the composition contains: about 20.00% w/w white petrolatum, about 17.50% w/w shea butter, about 3.50% w/w PEG-100 stearate, about 2.50% w/w Polysorbate 80, about 10.00% w/w trolamine salicylate, about 45.00% w/w purified water, about 1.00% phenoxyethanol and about 0.50% w/w potassium sorbate.

10. The topical pharmaceutical composition according to claim 1, wherein the topical pharmaceutical composition provides a pain alleviating effect for about 4 hours to about 8 hours.

* * * * *